United States Patent [19]

Tarui

[11] Patent Number: 5,029,178
[45] Date of Patent: Jul. 2, 1991

[54] HIGH REPETITION NITROGEN LASER ASSEMBLY USING A NITROGEN-ELECTRONEGATIVE GAS MIXTURE

[75] Inventor: Yoshihiro Tarui, Miyanohigashi, Japan

[73] Assignee: Horiba, Ltd., Kyoto, Japan

[21] Appl. No.: 459,917

[22] Filed: Jan. 2, 1990

[30] Foreign Application Priority Data

Jan. 14, 1989 [JP] Japan .................................. 1-6379/89

[51] Int. Cl.$^5$ .............................................. H01S 3/223
[52] U.S. Cl. ........................................ 372/60; 372/25; 372/30; 372/31; 372/55
[58] Field of Search ...................... 372/25, 30, 31, 55, 372/60, 33, 58, 59; 315/111.01, 150; 313/637, 643

[56] References Cited

U.S. PATENT DOCUMENTS

| | | | |
|---|---|---|---|
| 4,134,083 | 1/1979 | Sasnett et al. | 372/60 X |
| 4,484,106 | 11/1984 | Taylor et al. | 315/150 |
| 4,888,786 | 12/1989 | Davis et al. | 372/58 |
| 4,896,076 | 1/1990 | Hunter et al. | 315/150 |
| 4,937,500 | 6/1990 | Christophorou et al. | 315/150 |

*Primary Examiner*—Frank Gonzalez
*Assistant Examiner*—Galen J. Hansen
*Attorney, Agent, or Firm*—Price, Gess & Ubell

[57] ABSTRACT

An improved nitrogen laser includes two oppositely disposed discharge electrodes contained within a resonant chamber that is supplied with a mixture of nitrogen gas and a substantially small amount of electronegative gas. The mixture used within the chamber makes it possible to operate the nitrogen laser at a high voltage output and a higher frequency rate.

5 Claims, 3 Drawing Sheets

HIGH REPETITION NITROGEN LASER ASSEMBLY USING A NITROGEN-ELECTRONEGATIVE GAS MIXTURE

BACKGROUND OF THE INVENTION

1. Field of the Invention

The present invention relates to an improved nitrogen laser and, more particularly, to an improved gaseous mixture apparatus for supplying the same for use in nitrogen lasers.

2. Description of Related Art

Nitrogen lasers are known in the prior art, as shown in FIG. 4. Such a laser operates by providing a high voltage pulse between two oppositely disposed electrodes, thereby bringing about a discharge excitation, which can be seen as area A on FIG. 4. Nitrogen gas enters through an inlet port 3 into an excitation chamber 2 containing the two discharge electrodes 1 and 1'. When the electrodes discharge, nitrogen molecules coming into the chamber 2 from inlet port 3 are ionized by the discharge pulse. The nitrogen ions will subsequently recombine to form neutral nitrogen molecules. This recombination can take a significant period of time to occur. Further, the recombination will also occur on the surface of the discharge electrodes and along the inner walls of the chamber 2. Therefore, a large number of nitrogen ions will remain within the discharge chamber and between the electrodes after each discharge pulse. This leads to a lower energy potential between the discharge electrodes, making it difficult for the nitrogen ions to reach sufficient energy levels to become nitrogen molecules. Also, the presence of a large number of nitrogen ions yields a proportionately lower amount of nitrogen molecules. This proportionately lower amount of nitrogen molecules renders the operation or the transmission of the nitrogen laser inherently more difficult. Therefore, using the construction of lasers shown as FIG. 4, the recombination of the nitrogen ions takes a sufficiently long period of time, so as to make impossible the operation of a high repetition laser, such as a 1-kHz repetition rate.

FIG. 5 charts the power output of a nitrogen laser of FIG. 4. As can be seen, the laser has an initial poor stability over a period of time. Furthermore, FIG. 5 shows a decrease in the total mean output of the laser over the period of time. FIG. 5 employs a nitrogen and gas flow rate of 3 liters per minute.

FIG. 6 shows an output of the laser shown in FIG. 4 at a pulse rate of 1 kHz. Thus, the stability during this time period under the stated conditions can be seen as being ±25%.

In order to carry out the operation of a high repetition laser, it is necessary to keep the chamber 2 supplied with a fresh supply of nitrogen gas $N_2$. However, this requirement leads to increased consumption of $N_2$ gas to such an extent that a dramatic increase in the cost of operating the conventional nitrogen laser is seen. Accordingly, a nitrogen laser capable of operating at a high repetition rate, exceeding 100 Hz, has not been introduced onto the market, and there is a need in the prior art to provide for an improved nitrogen laser that resolves the above problems.

OBJECTS AND SUMMARY OF THE INVENTION

It is an object of the present invention to provide an economical and useful nitrogen laser capable of carrying out a high repetition operation and operating at a high output with increased stability, as well as reducing the running cost of the laser. In order to achieve the above-described object, a nitrogen laser according to the present invention is adapted to supply the inside of a vessel with a nitrogen gas and a small amount of electronegative gas. With the above-described construction, the nitrogen ions generated by the discharge of the electrodes are neutralized by the electronegative gas within a very short period of time. These neutralized nitrogen ions may then recombine, thus providing the potential for a high laser output that can be obtained with increased stability, even at a very high repetition rate of operation.

DESCRIPTION OF THE PREFERRED EMBODIMENTS

The following description is provided to enable any person skilled in the art to make and use the present invention and sets forth the best modes contemplated by the inventor of carrying out his invention. Various modifications, however, will remain readily apparent to those skilled in the art, since the generic principles of the present invention have been defined herein specifically to provide an improved nitrogen laser that can be easily maintained in operation.

Figure 1:
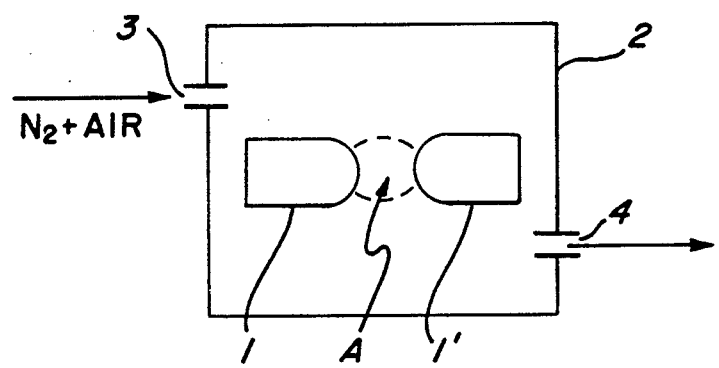
FIG. 1 is a block diagram showing the principal parts of a nitrogen laser according to the preferred embodiment.

Referring now to FIG. 1, showing an example of the present invention, reference numeral 1 designates discharge electrodes that are contained in a chamber 2. The chamber 2 is supplied with a mixture of $N_2$ gas and air entering through inlet 3. The air to $N_2$ ratio is not large. There may be, at most, 1% air in the mixture. After the gaseous mixture has exhibited a discharge at excitation area A, the used mixture is expelled through outlet port 4.

In a nitrogen laser having the above-described construction, when discharge is brought about between discharge electrodes 1 and 1', the reaction produces a nitrogen ion and a free electron, expressed by the following Equation (1):

$$N_2 \rightarrow N_2^+ + e \tag{1}$$

However, since chamber 2 is supplied with air as well as $N_2$ gas, there is oxygen in the mixture. The oxygen is hereinafter referred to as $O_2$. The oxygen contained in this mixture is an electronegative gas having the property of being adept at combining with an electron so that a reaction expressed by the following Equation (2) is brought about:

$$O_2 + e \rightarrow O_2^- \tag{2}$$

The result of the foregoing Equations (1) and (2) is that the negative oxygen ion is apt to be recombined with a positive nitrogen ion. This reaction between the oxygen ion and the nitrogen ion has the effect of neutralizing the discharge created by the pulse of the electrodes. This neutralization is expressed by the following Equation (3):

$$O_2^- + N_2^+ \rightarrow O_2 + N_2 \qquad (3)$$

Therefore, the nitrogen ions left between the discharge electrodes are recombined within a very short period of time so that the discharge excitation can be stably carried out at a high voltage. More importantly, this discharge excitation at a high voltage may be carried out at a very high repetition.

Figure 2:
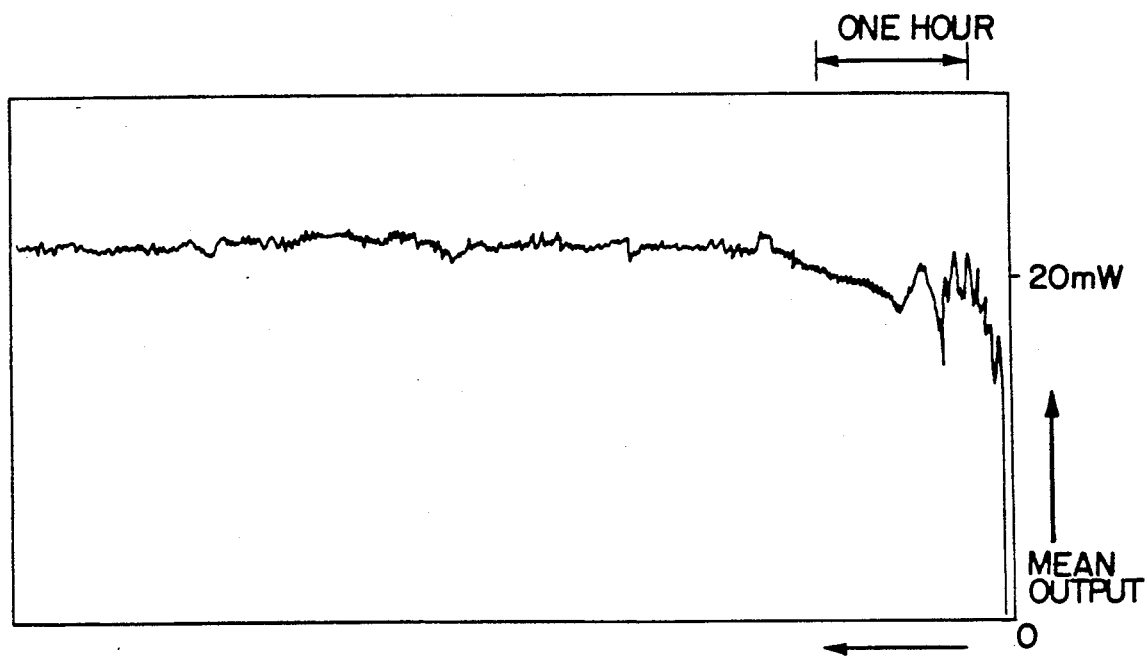
FIG. 2 is a graph showing the change in the mean output of the laser over a lapse of time.

FIG. 2 shows a change in the mean output of the above-described laser after a given period of time, when chamber 2 is supplied with a mixture of air and $N_2$ gas consisting of 1% air. Here the $N_2$+ air gas mixture will flow into inlet port 3 at a rate of 3 liters per minute of $N_2$ gas and 30 milliliters of air. It has been found that a mean output of 20 milliwatts can be obtained from the above-described nitrogen laser. This level of output has been difficult to obtain in a conventional nitrogen laser. However, this level can stably be sustained at a 1-kHz rate using the above-described improvement on the nitrogen laser.

Figure 3:
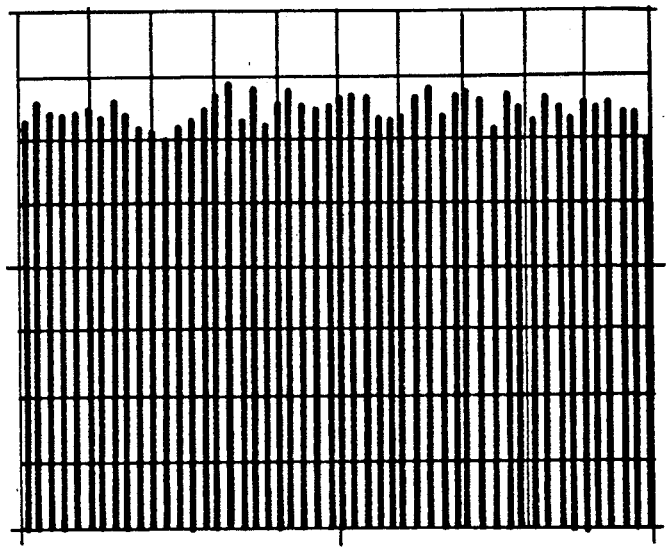
FIG. 3 is a graph showing the change in the output of a laser pulse of 1 kHz over a lapse of time.
Figure 4:
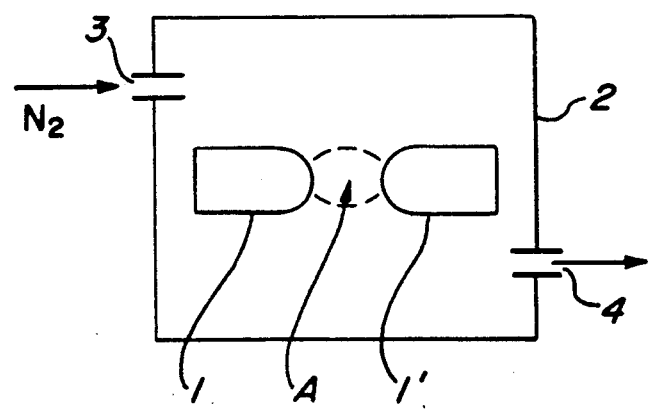
FIG. 4 is a block diagram showing the principal parts of a conventional prior art nitrogen laser.
Figure 5:
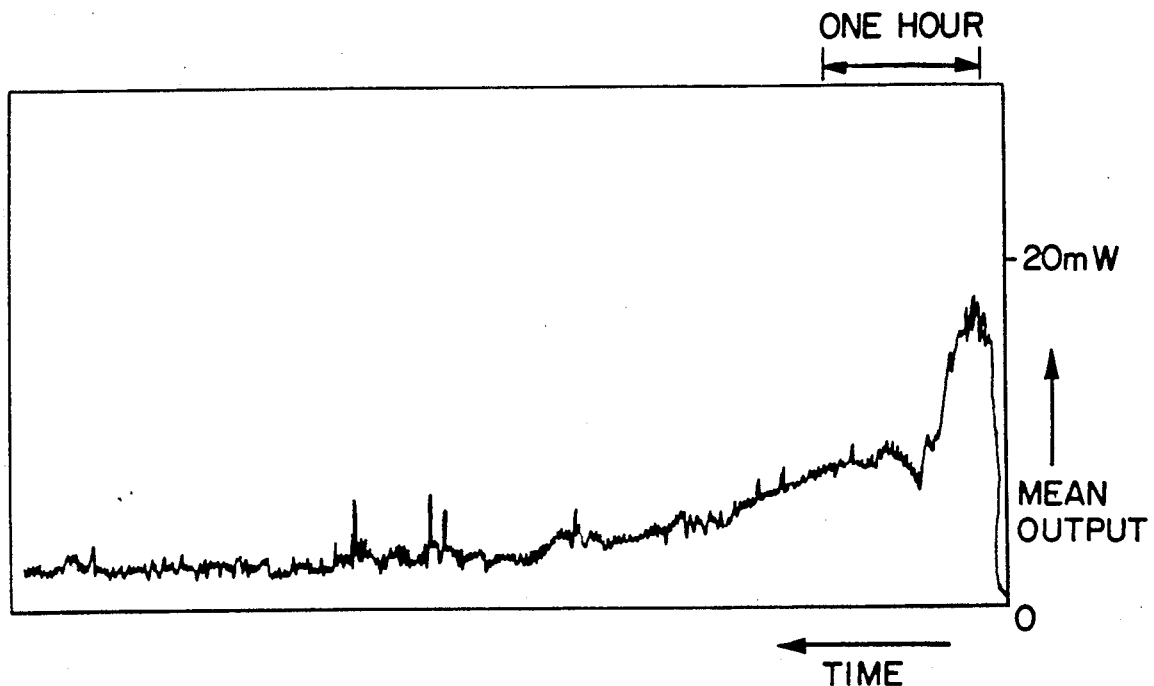
FIG. 5 is a graph showing the change for a mean output of the laser of FIG. 4 within a lapse of time.
Figure 6:
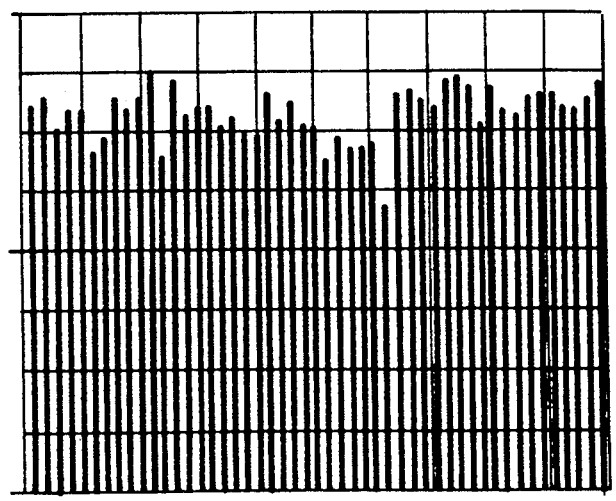
FIG. 6 is a graph showing the change in the waveform of the laser output pulse of the laser of FIG. 4 at 1 kHz.

FIG. 3 additionally shows the waveform of the above-described preferred embodiment of this invention with an output pulse of 1 kHz. It is seen that the stability of the invention in this embodiment is ±5%. This output is remarkably stable. The preferred embodiment has additional advantages in that only a slight amount of air is needed to combine with the $N_2$ gas. Therefore, the cost of running the nitrogen laser is not increased by the improvement. All that is required is a gas inlet pipe connected to inlet port 3 and a small pump.

The present invention is not limited to the above-described preferred embodiment. For example, $SF_6$ (sulfur hexafluoride gas) may be used in place of the $O_2$ gas. As already described for the above embodiment, the chamber 2 would be supplied with the nitrogen gas mixed with a slight amount of the electronegative gas so that the $N_2$+ produced by the discharge is neutralized and recombined within a remarkably short period of time due to the presence of the electronegative gas. Therefore, the output of the laser may be kept at a higher voltage level and will be stable over a long period of time, even at a high repetition rate of operation.

The discharge rate of the invention employing a mixture of electronegative gas with $N_2$ results in a frequency of operation that may approach 1 kHz. This is about ten times the frequency of operation of a conventional $N_2$ laser of this type. Therefore, the time required for measurements can be remarkably reduced. Additionally, the higher repetition rate of operation according to the present invention can be very economically produced.

What is claimed is:

1. A nitrogen laser comprising a resonant chamber and a pair of two oppositely disposed discharge electrodes within said chamber, the improvement therein comprising a gaseous mixture that is supplied to said chamber consisting of a mixture of a nitrogen gas with a substantially small amount of an electronegative gas to provide a high repetition operation.

2. The invention as set forth in claim 1, wherein said electronegative gas is an oxygen gas.

3. The invention as set forth in claim 1, wherein said electronegative gas is a sulfur hexafluoride gas.

4. The invention as set forth in claim 1 wherein the electronegative gas is contained in air as an oxygen gas.

5. A nitrogen laser capable of sustaining an output of 20 mW at a pulse rate of 1 kHz comprising:
   a pair of oppositely disposed electrodes capable of producing a high voltage pulse across said electrodes;
   a gaseous mixture consisting of air and nitrogen having a ratio of 1% air to nitrogen, and
   said gaseous mixture being passed into a resonant chamber containing said electrodes such that a discharge between said electrodes and the nitrogen in said gaseous mixture yields an electron, thereby forming a positive nitrogen ion, the oxygen in the air absorbs an electron, thereby forming a negative oxygen ion, and said positive nitrogen ion and said negative oxygen ion recombine so that said ions are neutralized, producing an output of 20 mW using a gaseous mixture of 30 milliliters air and 3 liters nitrogen per minute, having an electrode pulse rate of 1 kHz.

* * * * *